United States Patent [19]
Rosenberg

[11] 3,854,497
[45] Dec. 17, 1974

[54] COMBINATION SHUT-OFF VALVE AND FLOW CONTROL VALVE WITH SIDE ACCESS AND VIEWING PORT FOR OBSERVATION, TESTING AND ON-LINE SERVICING

[75] Inventor: David Rosenberg, Los Angeles, Calif.

[73] Assignees: Sydney Lampert, Studio City; Herman Wertheimer, Encino, both of, Calif. ; part interest to each

[22] Filed: July 1, 1971

[21] Appl. No.: 158,931

[52] U.S. Cl............. 137/557, 137/559, 137/269.5, 137/614.17, 137/504
[51] Int. Cl............................................ F16k 31/12
[58] Field of Search.......... 137/557, 559, 551, 375, 137/269.5, 504, 614.17; 251/315, 368

[56] References Cited
UNITED STATES PATENTS

| | | | |
|---|---|---|---|
| 1,175,328 | 3/1916 | Wright.............................. | 137/269.5 |
| 3,146,792 | 9/1964 | Donnelly et al. ............... | 137/614.17 |
| 3,254,667 | 6/1966 | McGuire et al..................... | 137/504 |
| 3,503,415 | 3/1970 | DeAngelis et al. ................. | 137/375 |
| 3,517,554 | 6/1970 | Smith............................. | 137/559 X |

FOREIGN PATENTS OR APPLICATIONS
748,888    5/1956    Great Britain................. 137/614.17

Primary Examiner—Henry T. Klinksiek
Attorney, Agent, or Firm—Bruce L. Birchard

[57] ABSTRACT

A combination shut-off and flow control valve with side access and viewing ports for observation, testing and on-line servicing, capable of being utilized to provide accurate control over wide ranges of pressures, for example, ten to one ranges or greater, and down to 3 p.s.i. differential, with variations in spring constant being employed over different parts of the operating range, if desired. The access port and window enable an inspector to ascertain visually that flow control elements within a rotatable valve member are operating properly while the valve remains on-line in actual service. The valve can be turned 90° to shut off both upstream and downstream ends, enabling flow control elements to be replaced (or adjusted) while liquid pressure remains at full value. By turning the handle to an intermediate position (approx. 45°) both upstream and downstream passages can simultaneously be drained or pressure and temperature can be measured. At another intermediate position (approx. 30°) only one passage can be drained while the other remains closed off. The floating flow control elements advantageously damp out and check downstream pressure surges, preventing oscillation build up.

15 Claims, 15 Drawing Figures

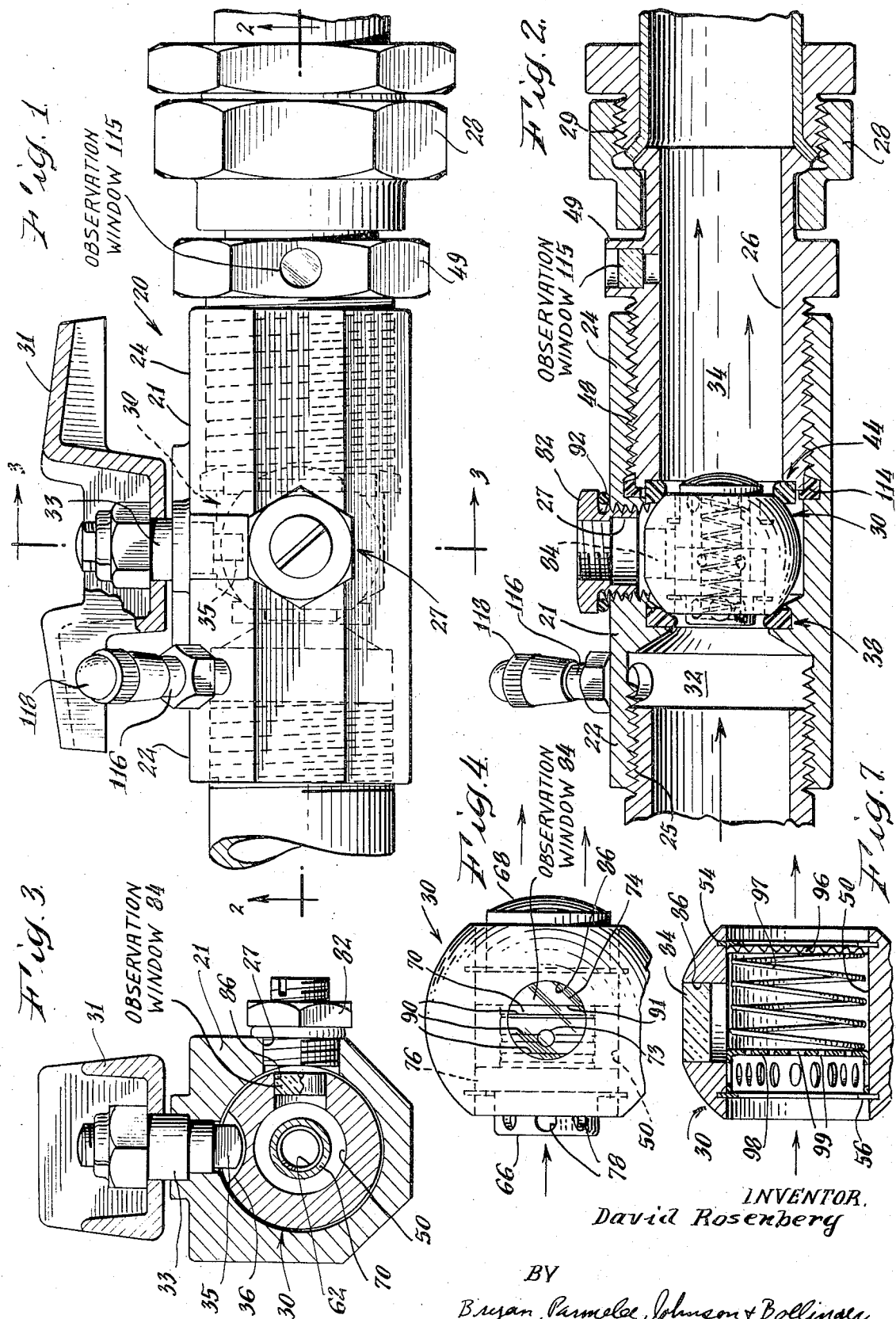

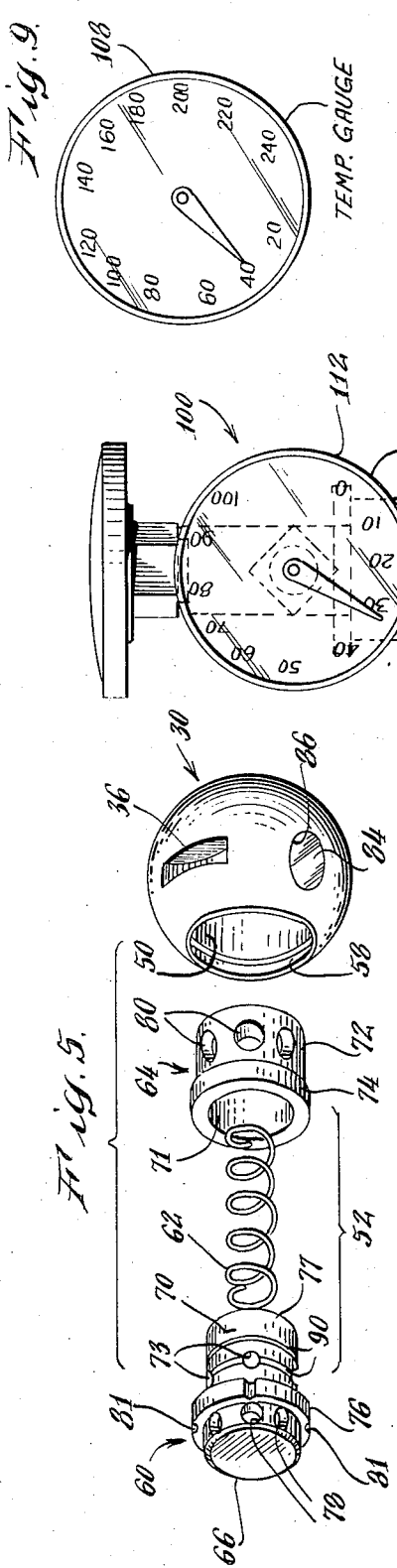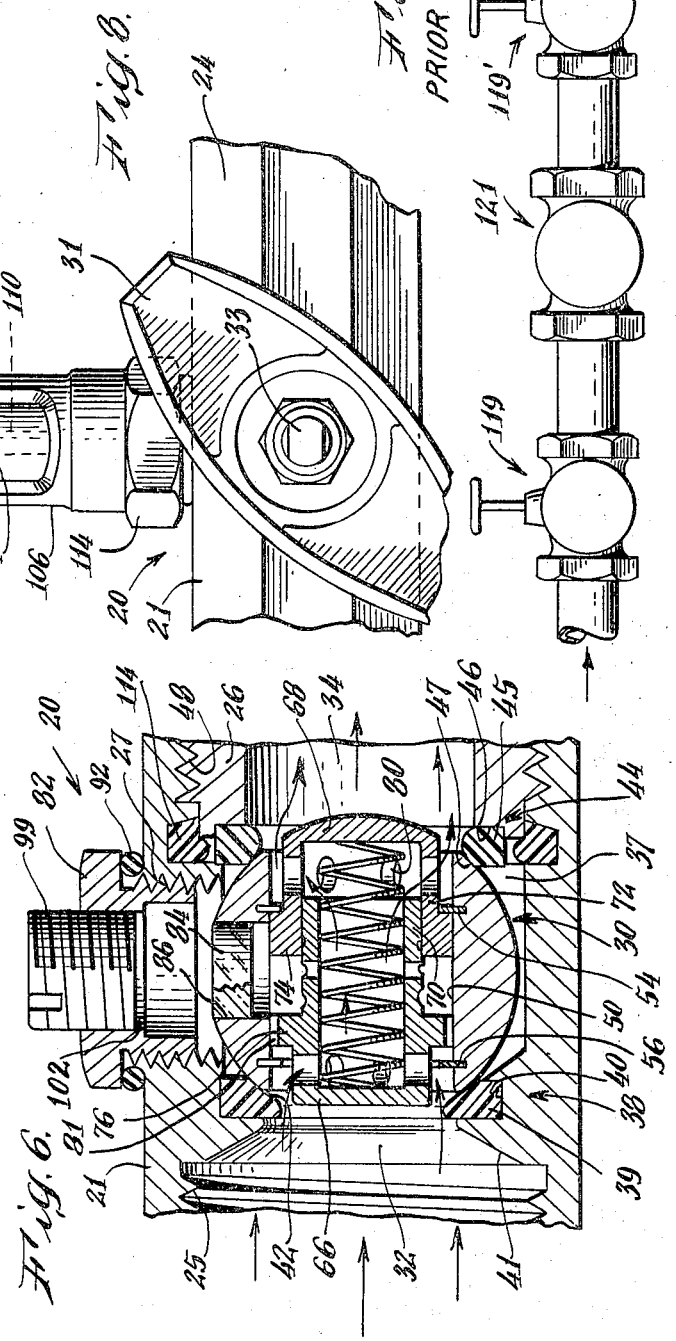

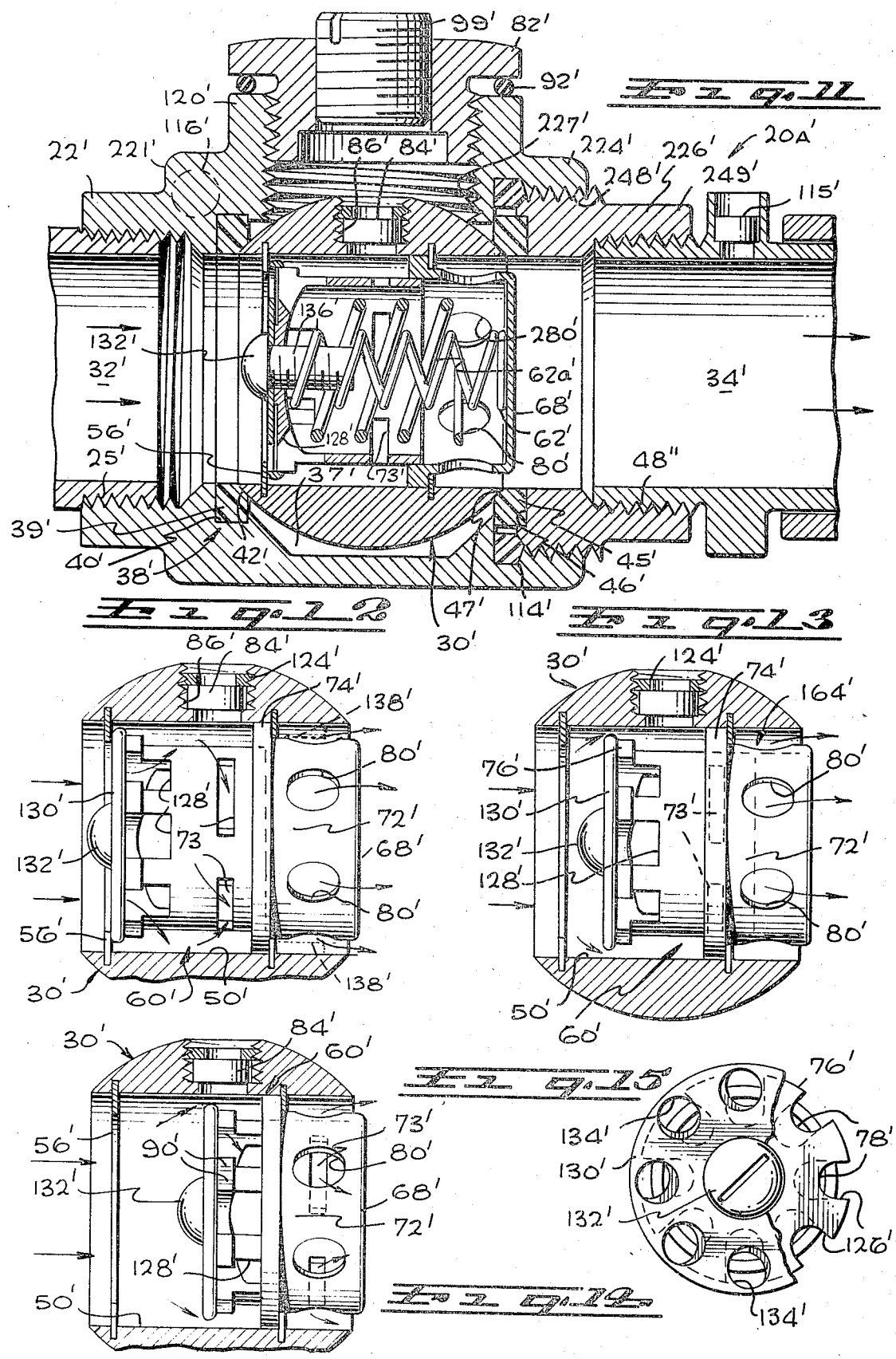

COMBINATION SHUT-OFF VALVE AND FLOW CONTROL VALVE WITH SIDE ACCESS AND VIEWING PORT FOR OBSERVATION, TESTING AND ON-LINE SERVICING

DESCRIPTION

The present invention relates to a combination shut off valve and flow control valve with side access and viewing ports for observation, testing and on-line servicing providing a number of novel features and important advantages as compared with prior art valves and practices.

BACKGROUND PRIOR ART INFORMATION

There are numerous commercial applications where it is desirable to utilize flow control valves in piping networks. For example, in heating and cooling systems for office buildings, apartments, hospitals, schools, and the like, water or other liquid at the appropriate control temperature is pumped from a central station through a piping network to various heat exchange units associated with the rooms, corridors, offices, and other occupancy spaces in the building. Some of these heat exchange units are located relatively close to the central station from which the control temperature liquid is being pumped and other heat exchangers are much further away. Due to frictional effects in the flow of the liquid through the piping network causing pressure drops, the liquid pressures occurring at the inputs and outputs of the respective heat exchange units are quite varied. Moreover, at various times in the day, the liquid flow in various sections or "zones" of the piping network may be increased or decreased to compensate for "sun load" heating in southern or western exposures or to compensate for northern exposure cold windage effects. Thus, the input and output pressures at the respective units in different parts of the building may change from time to time during the day.

This problem of variations in the input and output pressures occurring at the respective heat transfer units is important because the rate of liquid flow through each unit and hence its individual heating or cooling effectiveness is a function of the differential between input and output pressures. In addition, the individual units are affected by variations in temperature occurring in the liquid at various places in the piping network because of heat losses in winter or heat gains in summer.

Although it is possible to construct the piping networks in complex patterns so as to attempt to equalize the pressure differential occurring across each heat transfer unit, in most installations it is more desirable and much more economical to utilize a flow control valve associated with each individual heat transfer unit.

In present commercial practice throughout the United States today, it is customary to arrange the flow control valve in the manner as shown in FIG. 10, labelled "Prior Art." Namely, a total of three valves are installed, plus piping unions or couplings. A shut off valve is installed upstream and another shut off valve is installed downstream of the flow control valve itself. The reason for this triple installation of the prior art is that the inner working parts of flow control valves are subject to blockage or sticking due to accumulation of particles or silt which settle out of the water and become lodged in the flow control parts. When the valve becomes blocked or stuck, an improper circulation of liquid through the associated heat transfer unit occurs, causing excessive or reduced heating or cooling action.

In order to service the prior art flow control valve, the two shut off valves are first turned off. Then, the unions or couplings in the piping at the flow control valve are unscrewed so that it can be removed to be repaired or replaced.

The prior art installation of triple valves plus unions and couplings requires a substantial amount of labor and parts, and the assembly occupies a significant volume of space in the building to enable the plumber to install the assembly or later on be able to remove the flow control valve. In the prior art it sometimes occurs that one or the other or both of the shut off valves may be positioned at some slight distance from the flow control valve itself, but nevertheless their primary function is to shut off the liquid on both sides of the flow control valve so that it can be removed. A further drawback associated with the prior art triple valve arrangement is that the use of three valves calls for local straight runs of piping adjacent to opposite sides of the flow control valve to accommodate couplings or unions to enable its removal.

THE INVENTION

In accordance with the present invention there is provided a combination shut off valve and flow control valve with side access and viewing ports for observation, testing and on-line servicing. Among the advantages provided by this novel valve are the following:

1. A single valve replaces the triple valve assembly as customarily used in the prior art. There is a saving in parts, labor, and building space. In addition there are simplifications in piping layout made possible by this invention.

2. The side access port and viewing window enable an inspector to ascertain by visual inspection that the valve is operating properly while the valve remains on-line in actual service. The inspector can see if contaminants are present.

3. The rotatable shut off valve element includes a removable flow control cartridge contained within itself.

4. The flow control cartridge elements include graduated calibrated markings which enable the inspector to ascertain at a glance the controlled flow conditions occurring and to observe the response of the flow control elements when the liquid pressure in the line is varied.

5. While the combined valve as a whole remains in its installed position, the handle can be turned to shut off both the upstream and downstream ends of the valve. Then, the flow control cartridge can be removed to insert a substitute control cartridge or to remove any contaminants. Meanwhile, the liquid pressure in the system can remain at its normal pressure. There is no need for bleed down or drain down of the liquid in the line before the flow control cartridge is removed.

6. The flow control access port may be used to drain the system if desired by turning the rotatable valve member approximately 45° away from its normal flow control position.

7. The flow control access port can be used for directly measuring the liquid pressure and temperature.

A special meter device can be briefly attached to the access port for conveniently performing these measurements. After the measurements have been made, the rotatable element is turned back 45° to its normal operating position, the special meter device is removed and the side access port is reclosed all without permitting any significant leakage or escape of liquid from the system and while the system remains at its full operating pressure.

8. An air vent fitting may be built into the valve for permitting escape of any trapped air, if desired.

9. Adjustment of the sealing elements associated with the rotatable valve can be made to compensate for wear while the valve remains on-line in service.

10. The convenient removal and replacement of the flow control cartridge as listed under item 5 enables future operational or design changes of the system to be accomplished quickly and easily. The flow control cartridge is replaced with a similar cartridge having a different spring size or different sizes of orifices thereby to accommodate a different input-output pressure differential or to produce a different flow rate.

11. The flow control cartridge can be removed and replaced by a strainer cartridge having a viewing window to enable the inspector to determine the amount of contaminants which have been captured by the strainer.

12. The flow control cartridge has a movable throttling plunger element with orifices in the cylindrical side wall to enable the desired flow rate to be maintained over a wide range of pressure differentials.

13. The flow control cartridge is capable of providing control action even when the differential across the cartridge falls to a level of only 3 pounds per square inch (p.s.i.) by virtue of the fact that the downstream pressure acting upon the plunger element cooperates with the plunger spring in resisting the upstream pressure being applied. This 3 p.s.i. differential is markedly less than that of conventional flow control valves of similar size. This small operating differential enables sensitive accurate flow control to be achieved at zones which are remotely located from the central station and hence wherein the available input-output pressure differential is low due to accumulated pressure drop in the long piping lines involved in reaching the remote location.

14. In order to damp sudden downstream pressure surges, for example, such as occur when a shut off valve is suddenly closed downstream, the flow control cartridge includes a floating assembly having a second movable throttling plunger element facing downstream. This second plunger will move so as to damp out any such pressure surges. In the event of large downstream pressure surges, the floating assembly acts as a momentary check valve for preventing transmission of the pressure surge and preventing any build up of oscillation. Thus downstream surge pressures are immediately checked and damped out.

15. The side access port has provision for convenient connection of the special meter device discussed in item 7.

16. Substantial labor savings in "balancing" the system during start-up or during seasonal change-over from heating to cooling, in servicing the system and in any future system design changes are provided by the present invention.

These various features, aspects and advantages of the present invention will be more fully understood from a consideration of the following detailed description in conjunction with the accompanying drawings, in which:

FIG. 1 is a side elevational view of a combined shut off valve and flow control valve with side access and viewing port for observation, testing and on-line servicing embodying the present invention;

FIG. 2 is a longitudinal sectional view taken along the line 2—2 in FIG. 1;

FIG. 3 is a cross sectional view taken along the line 3—3 in FIG. 1;

FIG. 4 is an enlarged side elevational view of the rotatable ball valve member having a removable "floating" flow control cartridge assembly nested therein with a viewing window sealed into an observation port in the side wall of the ball member for revealing the calibrated markings which can be observed to enable the inspector to ascertain at a glance if contaminants are present, to see the controlled flow conditions occurring and to determine that the valve is operating properly;

FIG. 5 is an exploded perspective view of the rotatable ball valve member with the elements of the removable "floating" flow control cartridge assembly;

FIG. 6 is an enlargement of the central portion of FIG. 2 with the rotatable ball valve member and flow control cartridge elements shown in section;

FIG. 7 is a cross section of a ball valve member in which the flow control cartridge has been removed and replaced by a dual strainer filter assembly for trapping contaminants which are visible through the observation window;

FIG. 8 illustrates the convenient usage of a special metering device temporarily attached by a connection at the side access port of the combined valve unit for simultaneously measuring pressure and temperature of the liquid at the location of the valve unit. The capability of utilizing this metering device enables a heating and/or cooling system embodying the present invention to be "balanced" conveniently and rapidly at start-up or at seasonal change-over from cooling to heating;

FIG. 9 is a front view of the temperature gauge included in the special metering device of FIG. 8;

FIG. 10 is an illustration of the typical prior art installations in use today which include two shut-off valves with a flow control valve located between them;

FIG. 11 is an elevational sectional view of another embodiment of a combined shut-off valve and flow control valve of the present invention with side access and viewing port for observation, testing and on-line servicing;

FIGS. 12, 13 and 14 show various operating positions of the parts; and

FIG. 15 is a front view of an orifice adjustment dial.

Referring to FIGS. 1, 2 and 3 in greater detail, a combined shut-off valve and flow control valve unit 20 with a side access and viewing port of the present invention includes a casing 21 having an inlet end 22 and an outlet end 24 each with connection means adapted for installation in a liquid flow system. In this illustrative example, the inlet end 22 is internally threaded at 25, as seen most clearly in FIG. 2, to provide connection means for receiving the threaded end of a pipe. The outlet end 24 includes an adjustable seal retainer element 26 and a union end 28 which is internally threaded at 29 providing connection means for attachment to piping.

Although this illustrative example of the valve unit 20 is shown with threaded connection means 25 and 29 for installation, it is to be understood that the valve unit 20 can be made available with any type of "connection means" associated with the inlet and outlet ends. Such "inlet and outlet connection means" are intended to be broadly interpreted because they may include "sweat" fittings for soldering to metal tubing, flair fittings for clamping onto metal or plastic tubing or piping, union fittings for screwing onto various threaded elements, or for connecting the valve unit 20 directly to a heat exchange unit or to any other piece of equipment through which it is desired to control the flow in a liquid flow system.

Within the valve unit 20 there is a rotatable valve member 30 which can be turned into various operating positions by means of an operating handle 31 secured to a shaft 33. There are three operating conditions, as follows:

a. When the handle 31 is turned into its "longitudinal position" aligned with the inlet and outlet ends 22 and 24, as shown in FIG. 1, then the valve unit 20 is in its flow control operating condition for controlling the flow of liquid from the inlet to outlet and for damping out reverse pressure surges.

b. When the handle 31 is turned into its 90° position ("transverse position"), perpendicular to that shown in FIG. 1, the liquid flow is shut off. The shut off action occurs at both upstream sealing means and downstream sealing means. Thus, a side access port 27 (FIGS. 1, 2, 3 and 6) can be opened for visual inspection, testing or servicing without any significant leakage occurring.

c. When the handle is turned at an angle of approximately 45° ("intermediate position"), as seen in FIG. 8, then liquid can flow past the valve member 30 and out of the side access port 27 for conveniently draining the system without removing the valve unit or for directly measuring temperature and pressure at the valve unit as shown in FIG. 8.

The lower end of the handle shaft 33 has a tongue 35 (FIGS. 1 and 3) which keys into a slot 36 (see also FIG. 5) in the top of the valve member 30. This valve member 30 is generally ball-shaped. It is located within a generally cylindrical valve chamber 37 (FIGS. 2 and 6) defined by the casing wall 21, and it serves to control the liquid flow from an inlet passage 32 (FIG. 2) within the inlet end 22 to an outlet passage 34 within the outlet end 24.

The rotatable valve member 30 is seated between upstream and downstream sealing means which engage against opposite sides of the spherical surface of the valve member. The upstream sealing means 38 (FIG. 6) comprises an annular sealing element 39 formed of suitable sealing material, such as slippery and stiffly flexible plastic, e.g., polytetrafluoroethylene ("Teflon"), positioned in a groove 40 extending around the interior of the casing wall 21 adjacent to an inner shoulder stop or abutment 41. The downstream surface of the annular sealing element 39 is sloped or tapered at 42 (FIG. 6) so as to seat flush against the spherical surface of the rotatable valve member 30. The abutment shoulder 41 and groove 40 provide support for backing up the sealing element 39 to prevent it from becoming dislodged when the seal retainer 26 is tightened up snuggly. The downstream sealing means 44 (FIG. 6) comprises an annular sealing element 45 similar to the upstream sealing element 39 and formed of the same material as the upstream element, which fits into a recess 46 in the end of the seal retainer 26. Its upstream surface is sloped or tapered at 47 to seat flush against the valve member.

To prevent any significant leakage past the upstream and downstream sealing means 38 and 44, the seal retainer 26 (FIG. 2) is screwed up firmly along its threads 48 so as to engage the sealing elements' surfaces 42 and 47 snugly against the valve member 30.

It is noted that the seal retainer element 26 can advantageously be tightened up while the valve unit 20 remains on-line and in-service. The downstream end of the seal retainer 26 has an accessible head 49 which is shaped to be engaged by a wrench. While the retainer 26 is being tightened, the handle 31 is also gently turned back and forth so as to "feel" when the seals 39 aand 45 are snuggly engaged, without overtightening them. After periods of prolonged usage, the retainer 26 can be tightened up slightly further. This subsequent tightening can compensate for any wear of the valve member 30 or of the sealing elements 39 and 45 and so on, thereby providing a long life without ever disconnecting the valve unit 20 from its on-line, in-service position.

When the handle 31 is turned into the longitudinal position, as shown in FIG. 1, then the valve unit 20 is in its flow control operating condition, as mentioned above, for controlling liquid flow from the inlet passage 32 (FIG. 2) to the outlet passage 34. The valve member 30 has a cylindrical bore 50 (FIGS. 3, 4, 5 and 6) extending concentrically therethrough. A removable flow control cartridge assembly 52 (FIG. 5) is nested in the bore 50, being retained therein by a fixed retainer ring 54 (FIG. 6) providing an internal stop means and a removable C-shaped retainer ring 56. The snap-in ring 56 engages in a groove (FIG. 5) near the upstream end of the bore 50.

The flow control assembly 52 includes a first cylindrical plunger member 60, a compression coil spring 62, and a second cylindrical plunger member 64. Each of these plunger members 60 and 64 has the general configuration of a piston, including piston heads 66 and 68, respectively. The upstream piston member 60 includes an elongated cylindrical skirt or side wall 70 which telescopes, as shown in FIG. 6, within a socket 71 (FIG. 5) defined by the cylindrical skirt or side wall 72 of the downstream piston member 64. There are a few supplemental flow openings 73 in the skirt 70 which come into play at low pressure to enable design flow to occur at very low pressure differential.

In normal flow control operation, a rim of flange 74 on the skirt of the downstream piston member 64, rests against the fixed stop means 54 in the bore 50, as seen in FIG. 6. Another rim or flange 76 is located on the periphery of the piston skirt 70 intermediate the head 66 and the downstream end 77 of the skirt 70. This second rim 76 is sized to have clearance in the bore 50, as seen in FIG. 6.

In normal flow control operation, the liquid in the inlet passage 32 passes through a first plurality of flow openings 78 which are located in the side wall of the piston 60 between its head 66 and its peripheral rim 76. The liquid flows in a direction from outside the piston 60 into its interior. The liquid flows from the interior of upstream piston 60 into the interior 71 of downstream piston 64, and then outwardly through a second plurality of openings 80 in the downstream piston 64.

These second openings 80 serve as metering orifices for controlling the flow, as will be explained. There is a pressure drop which occurs as the liquid flows through the first openings 78 into the intermediate region between the first and second piston members. Thus, the pressure downstream of the head 66 and rim 76 is less than the pressure in the inlet passage 32. The openings 73 provide supplemental flow passages to allow the liquid which has by-passed the rim 76 in the bore 50 to flow into the skirt 70 at low pressure differential values, i.e. they serve as booster ports at low pressure, thereby to minimize pressure drop to only 3 p.s.i. At higher pressures, e.g. above 6 p.s.i., the ports 73 become blocked by moving beneath the rim 74.

The first differential in pressure caused by the flow through the fixed openings 78 exerts a downstream thrust upon the projected area of the piston 60. This thrust causes the spring 62 to be compressed so that the downstream end 77 of the skirt 70 partially blocks or closes the metering orifices 80.

This thrust can be expressed as follows:

$$(Pu - Pi) A = \text{Spring Force} = Kx \tag{1}$$

where $Pu$ is the upstream pressure, $Pi$ is the intermediate pressure in the region between the two piston members 60 and 64, and $A$ is the projected area of the upstream piston. $A$ is essentially the same as the cross sectional area of the bore 50. In this equation $K$ is the spring constant of the spring 62, and $x$ is the variable extent of displacement of the spring from its relaxed condition.

This equation can be rewritten as:

$$(\Delta P_{78})A = Kx \tag{2}$$

where $\Delta P_{78}$ is the upstream pressure differential occurring as a result of flow through the pressure drop orifices 78. It is important to note that $\Delta P_{78}$ is a variable. The faster the flow through the orifices 78, the larger becomes $\Delta P_{78}$, and vice versa.

This differential pressure ($\Delta P_{78}$) causes the upstream piston 60 to move downstream and begin closing off the metering orifices 80. As the metering orifices 80 are closed off by the downstream end 77 of the piston skirt 70, the flow out through the orifices 80 becomes reduced. The second pressure drop occuring in the metering orifices ($\Delta P_{80}$) increases as these metering orifices are closed. Thus, the pressure in the intermediate region ($Pi$) between the two pistons 60 and 64 increases. Consequently, the first differential in pressure ($\Delta P_{78}$) decreases.

In other words, the reduced flow through the pressure drop openings 78 has reduced the first pressure differential ($\Delta P_{78}$) while the second pressure differential ($\Delta P_{80}$) has been increased due to partial closure of orifices 80.

An equilibrium position for the first piston 60 is reached in which the first differential in pressure ($\Delta P_{78}$) times the projected piston area A equals the compressed spring force $Kx$. At this eqiulibrium position the flow through the metering orifices 80 is controlled to be equal to the desired value.

Assuming that the upstream pressure ($Pu$) rises, then momentarily the first pressure differential ($\Delta P_{78}$) increases because the increased upstream pressure tends to cause an increased flow. The first piston 60 moves slightly downstream, thus further closing the metering orifices 80. Consequently, the second pressure differential ($\Delta P_{80}$) increases further, causing an increase in the intermediate pressure ($Pi$) while the first pressure differential ($\Delta P_{78}$) is decreased so as to reach a new equilibrium position to control the flow, and so forth. The vast majority of any increase in upstream pressure always appears as the second pressure differential across the metering orifices 80.

Advantageously, the spring 62 must only resist the first pressure differential ($\Delta P_{78}$) and is not forced to resist the full upstream pressure ($Pu$). This feature of operation occurs because the intermediate pressure ($Pi$) is provided as generated by the creation of a second pressure drop ($\Delta P_{80}$) occurring through the metering orifices 80. Changes in the upstream or downstream pressures cause the piston 60 to move to restore the design (predetermined) differential pressure because of dynamic balance conditions created by the fixed and diminishing orifices 78 and 73, respectively, and the metering orifices 80 operating in concert with the spring 62.

In a preferred embodiment, the spring assembly 62 is arranged to have a stiffer spring characteristic for higher pressure differentials and a less stiff spring characteristic for lower pressure differentials. This variation may be accomplished by including a second spring 62a (as shown in FIG. 11) which is shorter and stiffer than the spring 62. Then the lighter spring 62 alone acts to provide accurate control over two-thirds of the control range. The heavier spring 62a also comes into play in the last one-third of the control range with respect to applied pressures.

Another way in which this dual spring characteristic can be obtained is to form a single spring with lighter convolutions at one end. As the spring is compressed, the lighter convolutions become compressed together, and then the heavier convolutions remain active to provide a stiffer spring constant over the last portion of the control range.

As soon as the metering openings 80 are partially closed, then the second pressure drop becomes far larger than the first drop ($\Delta P_{78}$). The intermediate pressure ($Pi$) which is thereby created aids the spring in resisting the upstream pressure ($Pu$). This action of the intermediate pressure in aiding the spring results in enabling a relatively light sensitive spring assembly to be used to provide accurate control over a wide range in applied pressures, with the lighter spring action preferably occurring over two-thirds of the control range to provide accurate control, and the stiffer spring action taking over control in the last one-third of the control range in applied pressures. Thus, a low pressure loss at low pressures is achieved and a high accuracy is also achieved over the full range.

This advantageous concerted dynamic action of a control valve embodying the present invention is quite different from those prior art control devices in which a control spring must resist substantially the full upstream pressure.

For example, in one range the valve unit 20 can accurately control the flow over a range of upstream pressure from 3 p.s.i. up to 40 p.s.i. greater than downstream pressures, i.e. over more than a 10 to one range. By utilizing a slightly stiffer spring assembly 62, the valve unit 20 can accurately control the flow over a range of upstream pressure from 10 p.s.i. up to 100 p.s.i. greater than the downstream pressures, i.e., over a 10 to one range. If any reverse pressure surge should occur, the assembly 52 will promptly damp and check it out. Reverse pressure surges can occur in a system when a downstream shut off valve is suddenly closed or when a downstream control valve suddenly closes. Such reverse pressure surges can cause bothersome oscillations in a system when there is any trapped air in the system or other factors producing resilience.

The reverse pressure surge causes the whole assembly 52 to move or "float" upstream until the rim 76 abuts against the retainer 56. Then the downstream piston 64 continues to move upstream while compressing spring 62 until the metering orifices 80 are fully closed, acting as a check valve. In this reverse surge mode, the orifices 80 are quickly closed to act as a check valve, because the spring 62 must resist progressively more and more of the full downstream pressure surge, as the orifices 80 are becoming progressively closed. In other words, in the reverse surge damping operation, substantially the entire pressure differential becomes applied to the downstream piston 64. Piston 64 is momentarily occupying the role of "upstream" piston during the reverse surge, producing almost instantaneous check valve action so as to check and damp out the pressure surge.

While the handle 31 is in its longitudinal position, a closure plug 82 (FIG. 6) can be unscrewed from the side access port 27 in the valve casing 21 positioned opposite to the center of the valve member 30. No significant leakage of liquid will occur through the open port 27, even though the valve unit 20 is online in service under full operating pressure. Thus, an inspector can look in through the side access port 27, and advantageously, he is enabled to see into the bore 50 through an observation window 84. This window is sealed in an observation port 86 centrally located in the side of the valve member 30 on the same side as the access port 27.

The window 84 is sealed in place when the valve is manufactured by accurately forming it as a circular disk of high quality strong glass which is sized to fit closely in the observation port 86. After the window is inserted in the port 86, the material of the ball member 30 adjacent to the window is "rolled" under pressure, causing the material to deform slightly so as to grip the perimeter of the glass disk tightly in a water tight joint.

In order to reveal at a glance to the inspector the operating condition of the flow control valve, the exterior of the first piston skirt 70 is encircled with a sequence of graduated scribed lines 90 (FIG. 5) which are permanently dyed with a contrasting color. These graduated markings 90 can readily be seen through the window 84, as seen in FIG. 4. Also, the second piston rim 74 can readily be seen through the window. The upstream edge 91 (FIG. 4) of the second piston rim 74 serves as a reference or index line with respect to which the inspector can see the relative positions of the graduated markings 90. In addition, unless the upstream pressure is at the low end of the operating range, the rim 76 of the first piston can be seen through the observation window.

The piston skirt 70 is formed of a bright corrosion resistant material, such as brass or bronze or stainless steel. Therefore, it provides a bright background to reveal any contaminants or particles if there are any circulating with the liquid in the system.

If the operation is satisfactory the inspector replaces the closure plug 82 together with its sealing gasket 92.

If the inspector wishes to service the valve unit 20, he momentarily replaces the plug and gasket 82 and 92. He turns the handle 31 to its transverse position, in which both the upstream and downstream passages 32 and 34 are completely shut off. In this transverse handle position, the upstream end of the bore 50 is directly aligned with the side access port 27.

The inspector again removes the closure plug 82, and he has direct access to the bore 50. The snap-in retainer clip is removed. Then, the whole flow control cartridge assembly 52 can be withdrawn through the side access port 27. The assembly 52 can be cleaned or replaced. The spring 62 can be replaced with a stiffer or lighter spring, if desired. A redesigned flow control cartridge 52 can conveniently be inserted if it is desired to change the operating characteristics of the system. It is to be noted that all of these things can be done while the valve unit 20 remains on-line with the system under full pressure, but no significant leakage occurs because both the upstream and downstream passages 32 and 34 are shut off.

If the valve were worn, such that slight leakage occurred, the inspector would tighten up slightly on the seal retainer 26.

For straining purposes, the flow control cartridge 52 can be replaced by a dual filter assembly as shown in FIG. 7. This assembly includes a strainer screen 96 which rests against the retainer stop 54, a spacer spring 97 and a perforated strainer element 98 adjacent to the removable retainer 56. The perforations 99 in the element 98 are larger than the mesh of the screen 96. Thus contaminant particles can pass through the openings 99 to become trapped in the bore 50 near the window 84 where they can be seen through the observation port 84 and can be removed through the side access port.

An effective system installation is to place a valve unit 20 containing a strainer assembly 96, 97, 98 upstream of the piece of equipment being controlled. Another valve unit 20 containing the flow control cartridge 52 is placed downstream of the piece of equipment. In this way the strainer assembly prevents contaminants from entering either the associated equipment or the combined shut-off and flow control valve. Also, the strainer valve can serve as a shut-off valve if it should ever become necessary to remove the associated equipment from the system.

In order to make measurements, a connection plug 99 (FIG. 6) is removed, and a special metering device 100 (FIG. 8) is screwed into a metering connection port 102 conveniently provided in the center of the closure plug 82. As soon as the metering device 100 is connected, the handle 31 is turned to its intermediate position (at approximately 45° as shown in FIG. 8). This intermediate handle position allows liquid to flow from the inlet passage 32 into the metering device 100.

A sight glass 104 in the barrel 106 enables the user to be sure that liquid is entering the barrel 106.

A temperature gauge 108 mounted at the outer end of the barrel 106 has a sensing probe 110 which extends along concentrically within the barrel for accurately measuring temperature of liquid therein. A pressure gauge 112 is mounted on the side of the barrel 106 for indicating the pressure of the liquid therein.

There is a wrench-gripping area 114 at the base end of the barrel 106 for convenience in attaching and disconnecting the special metering device 100 to the metering port 102. After the measurements are made, the handle 31 is turned back to its longitudinal flow control position before the device 100 is disconnected and the plug 99 replaced. Alternately, if service is to be performed, the handle 31 is turned to its transverse shut-off position. If it is desired to drain liquid from the system, then the handle can be left in its intermediate 45° position when the metering device 100 is disconnected.

There is a seal 114 (FIGS. 2 and 6) which is engaged by the inner end of the seal retainer element 26 to prevent leakage through the threads 48. Also, if desired, an observation window 115 may be provided in the head 49 of the seal retainer 26 to enable the user to view the liquid in the outlet passage 34.

An air vent 116, similar to an automobile tire valve, may be provided in the casing 21 to enable air to be bled from the system. To do so, the valve cap 118 is unscrewed and the inner valve stem (not seen) is then depressed, similar to bleeding air from a tire.

Although the ball valve member 30 is shown as being made of metal, it may be entirely made of high quality stress-relieved glass, polished to provide a smooth spherical configuration. The window 84 may then be ground in the glass ball to provide the desired observation. By appropriate shaping of the window 84 to create a lens, a magnification of the internal parts can be provided, if desired.

By-pass channels 81 (FIG. 5) may be provided, if desired, in the rim 76 to facilitate flow past this rim and into the booster ports 73 at low values of pressure differential.

FIG. 10 is an illustration of a typical prior art installation as used today with two shut-off valves 119 and 119' having a flow control valve 121 located between them. The present invention provides all of these functions plus other advantageous features and functions, as described.

In FIGS. 11–15 is shown another valve unit embodiment 20A' of this invention. Only the differences between the valve units 20A' and 20, and the additional features will be described.

The valve unit 20A' has an external side projection or boss 120' on its casing 21' in which is located the side access port 27'. The utilization of this external side projection 27' enables a larger rotatable ball valve member 30' to be utilized having a larger bore 50'. Thus, a greater flow capacity can be provided for a given size of threaded connection at 25' and 48''.

The downstream end 24' of the casing 21' is threaded at 48' to receive the adjustable seal-retainer element 26' which is shaped at its outer end 49' to receive a wrench for adjustment.

The observation window 84' is secured in its port 86' by means of a retainer ring 124' (FIG. 12). If desired, the whole ball member in the unit 20A' may be made of high quality stress-relieved glass, as discussed above, for the unit 20.

The metering orifices 80' formed in the side wall 72' of the second piston 64' are very large, as seen most clearly in FIGS. 12–14. These metering orifices 80' occupy almost the entire extent of the side wall 72' between the piston head 68' and the rim 74'. There are six large metering ports 80' thus providing large flow capacity at low values of upstream pressure.

The supplemental openings (booster ports) 73' are elongated circumferential slots, as seen in FIG. 12. There are four of these booster ports 73'.

When the upstream pressure increases to intermediate values, the first piston 60' is progressively moved downstream, thus diminishing the size of these booster ports 73' as they move beneath the rim 74'. Finally, these booster ports 73' are completely covered by the rim 74' of the second piston 64', as shown in FIG. 13.

FIG. 14 shows the first piston 60' when it has been moved all of the way downstream, telescoped into the second piston 64', by the highest value of upstream pressure within the operating range. It is noted that in FIG. 14, the upstream orifices 78' also have been partially covered by the rim 74', thus reducing the effective size of these orifices when operating near the upper limit of the pressure range.

As shown in FIGS. 11, 12 and 15, the upstream orifices 78' are formed by drilling at approximately 45° to the piston axis into both the front face and side wall 70' of the first piston 60'. Thus, notches 126' are formed in the rim 76', as seen in FIG. 15. The edges 128' (FIG. 12) of the orifices 78' downstream from the rim 76' are machined rectangular.

A lighter spring 62' is concentrically located with a heavier spring 62a'. The lighter spring 62' is sufficiently long to operate over the full range. The heavier spring 62a' is shorter and provides a stiffer spring action (increased spring constant) over the upper one-third of the pressure range.

In order to enable a single flow control cartridge assembly 52A (FIG. 12) to be utilized over different ranges of pressures, an upstream orifice adjusting dial element 130' (FIG. 15) is secured by a clamp screw 132' to the center of the upstream piston head. This adjustment dial 130' has a plurality of openings 134' which can be aligned with or offset from the orifices 78'.

By turning the dial 130', the tapered or angled openings 78' are adjustably partially closed. Locking means (not seen), such as a lock washer or knurled surfaces are provided between the dial 130' and the head of the piston 60' for firmly securing the dial 130' in its adjusted position when the clamp screw 132' is tightened. When the orifices 78' are partially closed, proportionately stiffer springs 62' and 62a' may be used for operating at higher pressures and higher differentials.

As seen in FIG. 11, the shank 136' of the screw 132' serves as centering means for generally locating the springs 62' and 62a'.

If it is desired to drain the upstream side 32' of the liquid system while shutting off the liquid in the downstream side 34', then the downstream end of the bore in the ball 30' is reduced in diameter, as indicated dotted at 138' in FIG. 12, to serve in lieu of the fixed retainer 54'. For example, the reduced bore portion 138' may have an internal diameter which is 75 percent of the upstream bore 50'. Then, when the ball valve member is turned approximately 60° away from its axial position with the upstream bore 50' displaced toward the side access port 27', the upstream passage 32' communicates with the side port, while the reduced bore portion 138' continues to close off the downstream passage 34'. When the closure plug 82' is removed, the upstream passage 32' is drained while the downstream passage 34' remains full.

When the ball valve member is turned approximately 45° away from its axial position, then both the upstream and downstream passages can be drained. Also, the special metering unit 100' can be utilized by replacing the plug 92' and removing the connection plug 99'.

The upstream and downstream edges of the elongated booster ports 73' serve as calibrated markings which can be observed through the window 84'.

It is seen that the present invention provides many different possible alternatives and options for offering great flexibility in installation and operation.

I claim:

1. Combination shut-off valve and flow-control valve with side access and viewing port for observation and on-line servicing comprising a valve casing having an inlet passage and an outlet passage, a rotatable valve member positioned in said casing between said inlet and outlet passages, said valve member being capable of being turned into different angular positions including a flow-control operating position and shut-off position, said valve member having a bore extending therethrough for permitting liquid flow to occur between said inlet and outlet passages when said valve member is turned into its flow-control position in which said bore communicates with both said inlet and outlet passages, flow-control means in said bore for controlling the liquid flow through said bore, said valve member shutting off both said inlet and outlet passages when said valve member is turned into its shut-off position in which said bore is angularly displaced away from said inlet and outlet passages, said casing having a side access port therein providing access to said valve member, openable closure means normally closing said side access port and capable of being opened for permitting access through said port to said valve member, a window in said valve member permitting observation of said flow-control means in said bore, said window being positioned in alignment with said access port when said valve member is turned into its flow-control position for providing visual inspection of said flow-control means through said side access port while said combination valve remains on-line in flow-control operation, and said bore being positioned in alignment with said side access port when said valve member is turned into its shut-off position for providing access to said flow-control means through said side access port for servicing said flow-control means while said combination valve remains on-line in its shut-off position, said flow-control means in said bore including plunger means movable downstream in said bore, spring means urging said plunger means in an upstream direction, and said plunger means including visible characteristics on its side such as scribed lines, graduations, side openings or the like which are observable through said window for visually determining the operating position of said plunger means.

2. Combination shut-off valve and flow-control valve with side access and viewing port for observation and on-line servicing comprising a valve casing having an inlet passage and an outlet passage, a rotatable valve member positioned in said casing between said inlet and outer passages, said valve member being capable of being turned into different angular positions including a flow-control operating position and shut-off position, said valve member having a bore extending therethrough for permitting liquid flow to occur between said inlet and outlet passages when said valve member is turned into its flow-control position in which said bore communicates with both said inlet and outlet passages, flow-control means in said bore for controlling the liquid flow through said bore, said valve member shutting off both said inlet and outlet passages when said valve member is turned into its shut-off position in which said bore is angularly displaced away from said inlet and outlet passages, said casing having a side access port therein providing access to said valve member, operable closure means normally closing said side access port and capable of being opened for permitting access through said port to said valve member, a window in said valve member permitting observation of said flow-control means in said bore, said window being positioned in alignment with said access port when said valve member is turned into its flow-control position for providing visual inspection of said flow-control means through said side access port while said combination valve remains on-line in flow-control operation, and said bore being positioned in alignment with said side access port when said valve member is turned into its shut-off position for providing access to said flow-control means through said side access port for servicing said flow-control means while said combination valve remains on-line in its shut-off position, said flow-control means in said bore including first and second plunger means, spring means urging said first plunger means upstream in said bore and urging said second plunger means downstream in said bore, said first plunger means being movable downstream against the action of said spring means in response to an increase in pressure differential, said flow-control means including a metering orifice and said downstream motion of said first plunger means serving to reduce the effective size of said metering orifice for controlling liquid flow, said second plunger means being movable upstream against the action of said spring means in response to downstream pressure surges for damping out downstream pressure surges, and one of said plunger means including visible characteristics on its side, such as scribed lines, graduations, side openings or the like which are observable through said window when said side access port is opened for visually determining the operating condition of said flow-control means while said combination valve remains on-line in flow controlling operation and whereby an inspector can observe the flow-control means responding to changes in liquid pressures under actual installed operating conditions of the combination valve.

3. Combination shut-off valve and flow-control valve as claimed in claim 2, in which removable retainer means serves to retain said first and second plunger means and said spring means in said bore, and said removable retainer means is accessible through said side access port when said rotatable valve member is turned into its shut-off position for enabling removal of said retainer means and removal of said first and second player means and spring means for servicing or replacement.

4. Combination shut-off valve and flow-control valve as claimed in claim 3, in which said rotatable valve member has a generally spherical configuration and there is second retainer means in said bore, said removable retainer means in its installed position and said second retainer means cooperatively serving to retain said first and second plunger means within the spherical configuration of said valve member under all operating pressure conditions so that said first and second plunger means will not protrude and jam said rotatable valve member against turning within said casing, whereby said rotatable valve member can be turned into its shut-off position at any time regardless of the operating pressure conditions of the liquid.

5. Combination shut-off valve and flow-control valve with side access and viewing port for observation and on-line servicing comprising a valve casing having an inlet passage on an outlet passage, a rotatable valve member positioned in said casing between said inlet and outlet passages, said valve member being capable of being turned into different angular positions including a flow-control operating position and shut-off position, said valve member having a bore extending therethrough for permitting liquid flow to occur between said inlet and outlet passages when said valve member is turned into its flow-control position in which said bore communicates with both said inlet and outlet passages, flow-control means in said bore for controlling the liquid flow through said bore, said valve member shutting off both said inlet and outlet passages when said valve member is turned into its shut-off position in which said bore is angularly displaced away from said inlet and outlet passages, said casing having a side access port therein providing access to said valve member, openable closure means normally closing said side access port and capable of being opened for permitting access through said port to said valve member, a window in said valve member permitting observation of said flow-control means in said bore, said window being positioned in alignment with said access port when said valve member is turned into its flow-control position for providing visual inspection of said flow-control means through said side access port while said combination valve remains on-line in flow-control operation, and said bore being positioned in alignment with said side access port when said valve member is turned into its shut-off position for providing access to said flow-control means through said side access port for servicing said flow-control means while said combination valve remains on-line in its shut-off position, said rotatable valve member being capable of being turned into an intermediate position between said flow-control operating position and said shut-off position, said valve member when in said intermediate position enabling liquid to flow from both of said inlet and outlet passages to said side access port, and said side access port having connection means associated therewith enabling temperature and pressure measuring means to be connected thereto for measuring temperature and pressure of the liquid while the combination valve remains on-line and thereby also enabling liquid to be drained from both said inlet and outlet passages through the opened side access port.

6. Combination shut-off valve and flow-control valve as claimed in claim 5, in which said intermediate position is that in which said valve member is turned at an angle of approximately 45° to its flow-control operating position.

7. Combination shut-off valve and flow-control valve as claimed in claim 5, in which said bore has a smaller diameter at the downstream end thereof than at the upstream end, and said valve member being capable of being turned into a second intermediate position between the shut-off position and the previously described intermediate position, said second intermediate position permitting liquid to flow from the inlet passage out of the opened side access port while the outlet passage is shut off, whereby the upstream liquid can be drained through the side access port while the downstream liquid is retained.

8. Combination shut-off valve and flow-control valve as claimed in claim 7, in which said second intermediate position is that in which said valve member is turned at an angle of approximately 60° to its flow-control operating position.

9. Combination shut-off valve and flow-control valve with side access port for on-line servicing and testing comprising a valve casing having an inlet passage and an outlet passage, a rotatable valve member positioned in said casing between said inlet and outlet passages, said valve member being capable of being turned into different angular positions including a flow-control operating position and a shut-off position, said valve member having a bore extending therethrough for permitting liquid flow to occur between said inlet and outlet passages when said valve member is turned into its flow-control position in which said bore communicates with both said inlet and outlet passages, flow-control means in said bore for controlling the liquid flow through said bore, said valve member shutting off both said inlet and outlet passages when said valve member is turned into its shut-off position in which said bore is angularly displaced away from said inlet and outlet passages, said casing having a side access port therein providing access to said valve member, openable closure means normally closing said side access port and capable of being opened for permitting access through said port to said valve member, said bore being positioned in alignment with said side access port when said valve member is turned into its shut-off position for providing access to said flow-control means through said side access port for servicing said flow-control means while said combination valve remains on-line in its shut-off position, said flow control means in said bore including first and second plunger means, spring means urging said first plunger means upstream in said bore and urging said second plunger means downstream in said bore, said first plunger means defining a first orifice and being movable downstream against the action of said spring means in response to an increase in pressure differential, said flow control means including metering orifice means, said downstream motion of said first plunger means serving to reduce the effective size of said metering orifice means for controlling liquid flow, said second plunger means being movable upstream against the action of said spring means in response to downstream pressure surges for damping out downstream pressure surges, and removable retainer means for retaining said first and second plunger means in said bore, said retainer means being accessible through said side access port when said valve member is turned into its shut-off position.

10. Combination shut-off valve and flow-control valve as claimed in claim 9, in which said first and second plunger means comprise upstream and downstream hollow pistons, respectively, each having a piston head with a side wall forming a skirt, the skirt of one of said pistons telescoping within the skirt of the other, and in which said spring means is a compression coil spring located within said hollow pistons urging them to move away from each other.

11. Combination shut-off valve and flow-control valve as claimed in claim 10, in which said metering orifice means comprises a plurality of metering openings in the skirt of said downstream piston, said openings being progressively restricted by the skirt of the upstream piston means as the two pistons are relatively moved toward each other.

12. Combination shut-off valve and flow-control valve as claimed in claim 11, in which both said upstream and downstream pistons are movable in said bore, whereby pressure surges occurring downstream of said valve can cause said downstream piston to move in an upstream direction, thereby restricting said metering openings to damp out such pressure surges.

13. Combination shut-off valve and flow-control valve as claimed in claim 9, in which said spring means includes a longer lighter compression coil spring concentric with a shorter stiffer compression coil spring for providing a stiffer effective spring constant when said first and second plunger means have moved toward each other a predetermined distance.

14. Combination shut-off valve and flow-control valve as claimed in claim 9, in which said first orifice defined by said first plunger means includes a pluarlity of openings, and adjustable means for adjusting the effective size of said openings for adjusting said flow control means for different operating conditions.

15. Combination and shut-off valve and flow-control valve as claimed in claim 14, in which said adjustable means comprises a member rotatably mounted on said first plunger means, said member including a plurality of openings adjustable with corresponding openings in said first plunger means, and said member being rotatable to offset the openings therein from the openings in said first plunger means for reducing the effective size of said openings.

* * * * *